United States Patent [19]

Larsson et al.

[11] Patent Number: 5,548,750

[45] Date of Patent: Aug. 20, 1996

[54] SYSTEM FOR TAKING BACKUP IN A DATA BASE

[75] Inventors: Bo E. S. Larsson, Huddinge; Iván M. Sanchez, Stockholm, both of Sweden

[73] Assignee: Telefonaktiebolaget LM Ericsson, Stockholm, Sweden

[21] Appl. No.: 162,899

[22] Filed: Dec. 8, 1993

[30] Foreign Application Priority Data

Dec. 8, 1992 [SE] Sweden .................. 9203691

[51] Int. Cl.$^6$ .............. G06F 15/40; G06F 11/00
[52] U.S. Cl. ............ 395/600; 364/DIG. 1; 364/DIG. 2; 364/269.3; 364/974.7; 364/964.1
[58] Field of Search ................. 395/600, 575, 395/700, 425, 250, 400

[56] References Cited

U.S. PATENT DOCUMENTS

| | | | |
|---|---|---|---|
| 4,077,059 | 2/1978 | Cordi et al. | 395/600 |
| 4,159,517 | 6/1979 | Paradine et al. | 395/250 |
| 4,635,189 | 1/1987 | Kendall | 395/600 |
| 4,648,031 | 3/1987 | Jenner | 395/575 |
| 4,686,620 | 8/1987 | Ng | 395/600 |
| 4,714,995 | 12/1987 | Materna et al. | 395/600 |
| 4,819,156 | 4/1989 | DeLorme et al. | 395/575 |
| 4,819,159 | 4/1989 | Shipley et al. | 395/575 |
| 5,043,871 | 8/1991 | Nishigaki et al. | 395/600 |
| 5,101,488 | 3/1992 | Rosenthal et al. | 395/425 |
| 5,131,084 | 7/1992 | Kasashima et al. | 395/325 |
| 5,136,707 | 8/1992 | Block et al. | 395/600 |
| 5,155,678 | 10/1992 | Fukumoto et al. | 395/600 |
| 5,170,480 | 12/1992 | Mohan et al. | 395/600 |
| 5,201,044 | 4/1993 | Frey, Jr. et al. | 395/575 |
| 5,307,481 | 4/1994 | Shimazaki et al. | 395/575 |

*Primary Examiner*—Thomas G. Black
*Assistant Examiner*—C. Pham
*Attorney, Agent, or Firm*—Burns, Doane, Swecker & Mathis, L.L.P.

[57] ABSTRACT

For backing up in a distributed real time data base on primary memory in operation, all data in the data base are structured as belonging to one of several logic data bases. The logic data can, but need not, extend over several processors. A backup function of a certain logic data base is activated by sending a message to a central backup handler, which has information regarding processors, over which the current backup system extends, and synchronizes the backup function over processor borders. The synchronization includes that local data base handlers are informed that backup will be started and that a new transaction log is being created, in which all transactions that have not attained a commit state and which shall therefore not be included in the backup are logged. The backup will only contain changes of transactions in the old transaction log.

12 Claims, 9 Drawing Sheets

Transaction (to Fig. 6 – store, update, erase)

Trans.log handler

Local data base handler

FIG. 7a
User
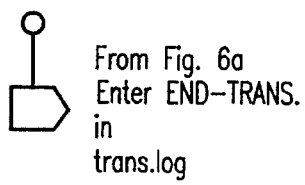
FIG. 7b
Trans.log handler
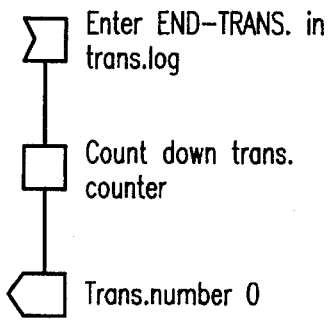
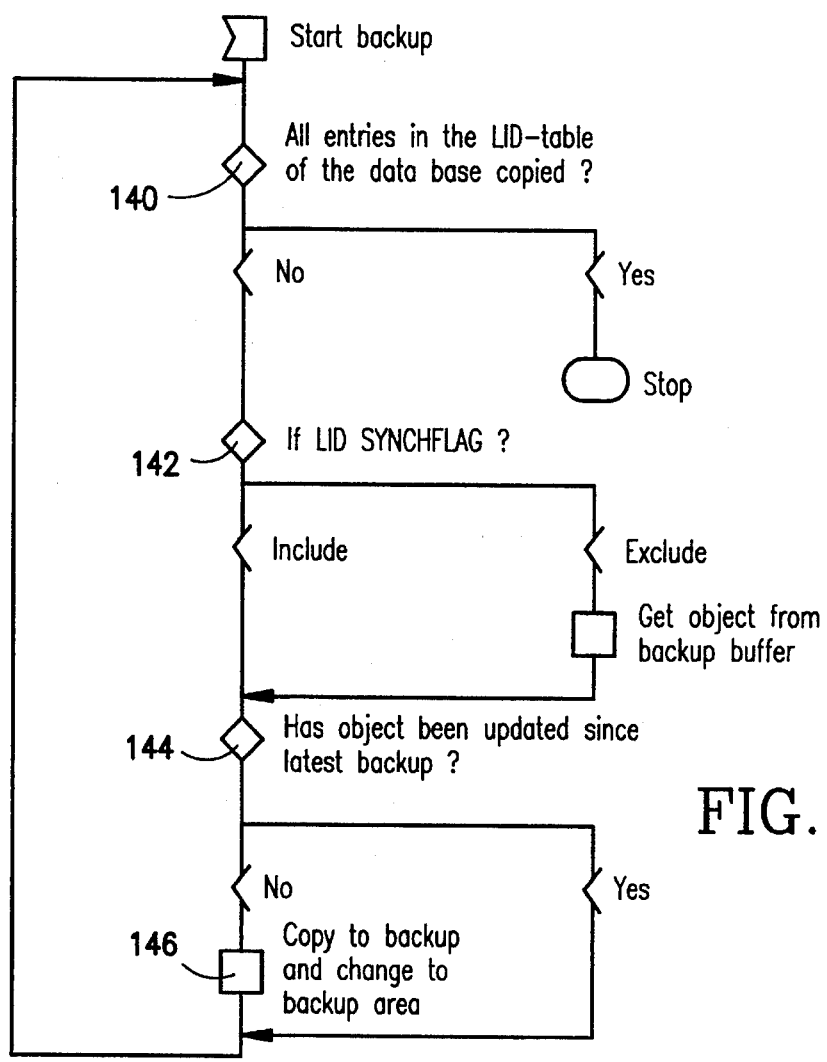
FIG. 8

UPDATE

| | BackupV in LID = Exclude | BackupV in LID = Include |
|---|---|---|
| BackupV in dbrec. = Exclude | Neither the new data base record nor the old one shall be included in the backup. The database handler throws the old data base record. | The new dbrecord shall not be included in the backup, but the dbrecord in the LID table Shall. The data base handler saves the dbrecord in the LID table in the backup buffer and changes BackupSynch variable in LID table to Exclude |
| BackupV in dbrec. = include | The new data base record but not the old one shall be included in the backup. The data base handler throws the old data base record stored in the LID table and changes the BackupSynch variable in LID table to Include | The new dbrecord shall be included in the backup. Database handler throws the dbrecord in the LID table. The BackupSynch variable in the LID table is not changed. |

FIG. 12

CREATE

|  |  | BackupV in LID = Include (default) |
|---|---|---|
| BackupV in dbrec. = Exclude |  | The new dbrecord shall not be included in the backup. The data base handler changes the BackupSynch variable in the LID table to Exclude |
| BackupV in dbrec. = include |  | The new dbrecord shall not be included in the Backup. The BackupSynch variable in LID table does not need to be changed. |

FIG. 13

REMOVE

|  | BackupV in LID = Exclude | BackupV in LID = Include (default) |
|---|---|---|
| BackupV in dbrec. = Exclude | The remove operation shall not be visible in the backup and the dbrecord in the LID table shall be included in the backup. The data base handler throws the old dbrecord and changes the BackupSynch variable in the LID table to Exclude. | The remove operation shall not be visible in the backup but the dbrecord in LID table shall be included in the backup. The data base handler saves the dbrecord in the LID table in the backup buffer and changes BackupSynch variable in the LID table to Exclude. |
| BackupV in dbrec. = include | The remove operation shall be visible in the backup and therefore the dbrecord in the LID table is removed. The BackupSynch variable in the LID table is not changed. | The remove operation shall be visible in the backup and therefore the dbrecord is removed from the LID table. The BackupSynch variable in the LID table is not changed. |

FIG. 14

SYSTEM FOR TAKING BACKUP IN A DATA BASE

BACKGROUND

The present invention relates to a system for taking backup in a distributed real time data base in operation, which is located on primary memory.

This application claims priority from Swedish patent application no. 9203691-2, filed Dec. 8, 1992, which is expressly incorporated here by reference.

A data base normally has a recover functionality responsive for data stored in the data base being consistent, i.e., being in a state to be expected with respect to different up-dates.

For enabling recovery from errors write-damaging the data base, a backup version needs to be stored. A backup includes all information necessary for being able to recover the data base to the same consistent state that prevailed at the time when the backup version was created.

A typical strategy for recovering a data base can be summarized as follows.

If the data base has become inconsistent due to a catastrophic error having occurred, the recovery function orders restart with reloading of the data base to the latest backup version. In order to enable return to a more current state, the data base is then updated with information that has been stored in a log, i.e., a history of earlier operations stored in a memory. The log is used by the recovery function for restoring the latest allowed transactions, i.e., operations on objects or records in the data base.

The term "object" is here intended to have the conventional meaning within the data processing art. In short, an object is an information packet with an associated description of how to manage its information. The objects are divided into classes after their area of use, and are identified by means of object identities. A more detailed description of the concept of object can be found, e.g., in "OBJECT-ORIENTED ANALYSIS" by Peter Coad and Edward Yourdon, Yourdon Press Computing Series.

The information and mechanisms required for recovery of the data base are determined by the method chosen for updating the data base. In case of updating an object a copy of the original object is created, a lock is set for preventing other users from updating the data base, and at commit, i.e., the transaction operation used by a program or an operator for indicating that a current transaction has been ended and that its effects should remain, the updated copy is switched in and set locks are released.

Copied objects or objects which shall not be submitted to backup are erased at restart of the database with reloading.

Within the current technical area it is highly desirable that the data base system not stop during backing up.

In U.S. Pat. No. 4,077,059 a system is described having a hierarchic memory with two memory units on each level. One of the units contains all data on this level. The other unit contains only changes which have been made to these data. By duplicating and recovering only changed data, the amount of data which must be transported in case of errors, is decreased.

The patent does not describe a data base system in a strict sense. There is no backing up functionality activated by a central handler which has information about the system and synchronizes the functionality.

U.S. Pat. No. 4,714,995 describes an integrated processor system with associated data bases. Integration is done of processor systems having a need of sharing certain common data elements, where each processor system has a data base. The object is to perform controlled copying. Relations and transactions are allowed to extend over several data bases.

SUMMARY

One object of the invention is to provide a system of the kind indicated by way of introduction, by means of which transactions are allowed to perform operations to the data base at the same time as backing up is performed.

In accordance with the invention this has been attained in a backup system for a real time data base on primary memory in operation, the data base being distributed over a number of processors which execute the different functionalities, such as different steps and features, stated below. The back up system comprises a number of logic data bases, each of which is able to extend over several of the processors, and each has a backup device associated therewith. All data in the real time data base is structured as being distributed over the logic data bases. The system further comprises a central backup handler, which has information regarding processors over which the backup system extends, a local data base handler for each processor, and an activating device for activating the backup device of a current one of the logic data bases by sending a message to the central backup handler to perform synchronization of the backup device over processors over which the current logic data base extends.

The synchronization includes the local data base handlers being informed that backup will be started and that a new transaction log should be created, in which all transactions which shall not be included in the backup are logged, whereby backup will only contain changes of transactions in an earlier transaction log.

In other words, the invention involves that all data in the data base are structured as belonging to one of several logic data bases, a logic data base being able to, but not needing to extend over several processors. The backup device of a certain logic data base is activated by sending a message to a central backup handler, which has information regarding processors, over which the current backup system extends, and synchronizes the backup device over processor borders. The synchronization includes that local data base handlers are informed that backup will be started and that a new transaction log is being created, in which all transactions having not attained commit state and shall therefore not be included in the backup are logged. Backup will then contain only changes of transactions in the old transaction log.

According to one embodiment, activation of the backup device for a certain logic data base is performed periodically or, at need, by an operator.

Preferably the synchronization includes that the central backup handler instructs the local data base handlers to set a backup flag in the logic data base in question, which informs the local data base handlers that backup will be started and makes that they change behavior with respect to storing objects located in the current logic data base, whereupon, after setting backup flag, the local data base handlers acknowledge by informing the central backup handler that this has been carried through.

When all local data base handlers have acknowledged, the central backup handler instructs all local log handlers for current processors to create the new transaction log.

Preferably the new transaction log may include a "BackupSynch" variable which can take the values "Include" or "Exclude" and the value of which is used by the local data base handler and by the local backup handlers to decide whether objects shall be included in a backup or not, the central backup handler instructing the local log handlers to change that variable in the new transaction log to "Exclude", implying that the object thereof shall not be included in the backup.

The "BackupSynch" variable may be collected from a coordinator for a transaction in connection with entering "COMMIT" into the transaction log, implying that the transaction has attained commit state, and then sends the value of the "BackupSynch" variable and the "COMMIT" message to all participating transactions, which in turn distribute the "BackupSynch" value to the different data base objects, whereby all objects in the transaction get the same "BackupSynch" value and will be included in or alternatively excluded from backup, According to a further embodiment, a counter is arranged to indicate the number of proceeding transactions in the COMMIT state towards the old transaction log, the synchronization including that when the count of the counter is zero, the central backup device is informed that there is no coordinator for any transaction in the current processor wishing that updatings shall be included in the backup.

In still a further embodiment, copying of objects to the backup area starts after the local log handlers have been informed that the local data base handler has made all changes from transactions, which shall be included in the backup, visible in the data base.

Preferably the making visible may include synchronization between the local data base handler, backup handler and local handler, The synchronization may be performed by the local log handler keeping up with the number of transactions existing in the old transaction log, the number of transactions are counted down when the transaction enters END-TRANSACTION in the old transaction log, and END-TRANSACTION is entered when the local data base handler has performed the changes in the data base and informed this to transaction.

Preferably the central backup handler instructs all local backup handlers, when the number of transactions in the old transaction log is zero in all local log handlers, to begin copying objects to be included in the backup to the backup area, the objects having been backup marked by the local data base handler in response to its change of behavior when the backup flag was set.

According to a further embodiment, copying of objects is performed to the backup area, and the old backup is stored in a primary memory until the new backup is ended, whereupon the old backup is packeted and stored in a secondary memory.

BRIEF DESCRIPTION OF THE DRAWINGS

Embodiments of the invention will now be described more closely with reference to the attached drawings, in which:

FIGS. 2–8 are flow charts illustrating the backing up functionality in a data base according to FIG. 1;

FIGS. 12–14 are tables illustrating measures which may be required in connection with the backup described with reference to FIGS. 10 and 11.

DETAILED DESCRIPTION

Figure 1:
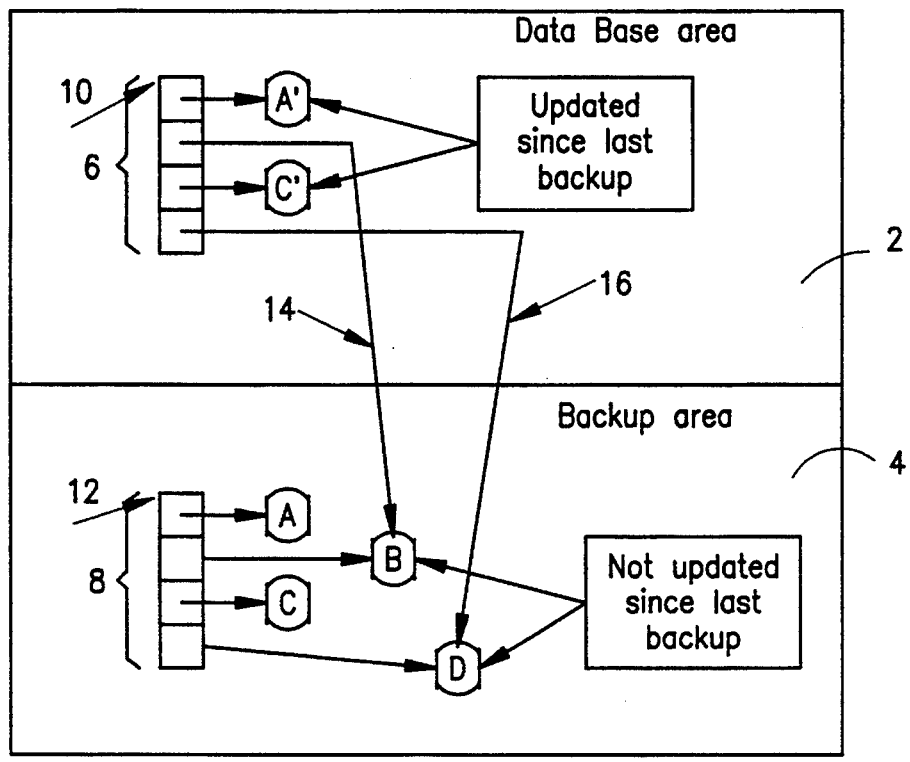
FIG. 1 illustrates schematically a solution for primary memory backup of a data base, where the invention can be used.

Above and in the description given below with reference to embodiments, as well as in the drawings, different functionalities are referred to as "handlers", such as data base handler, backup handler, etc., "logic data base", etc. Such functionalities are programs or steps executed by the computers involved, unless appearing otherwise from the concept.

The concept of logic data base defined above may also alternately be denominated RecDB in the drawings, which is an abbreviation for Recovery Data Base.

FIG. 1 shows a primary memory divided into two parts 2 and 4, schematically representing a data base area and a backup area, respectively, in the primary memory of a processor. Associated with each area there is a catalogue 6 and 8, respectively, of objects with associated classes which are stored in the data base. Corresponding catalogues as the catalogues 6 and 8 may, below and on later drawing Figures, also be called LID-table. By means of respective pointer 10 and 12 objects to be subjected to an operation are chosen with knowledge of the associated class and key.

FIG. 1 illustrates the data base and backup areas 2 and 4 after certain updatings of data base objects. In the Figure objects updated since latest backup are identified with prime signs. Since latest backup objects A and C have been updated to A' and C'. Objects B and D have not been updated. The backup area is write protected but allows reading of data. More particularly only the updated objects A' and C' are stored in the data base area 2, whereas objects A, B, C and D are stored in the backup area 4, and the data base points to the objects B and D in the backup area 4, indicated by arrows 14 and 16.

According to one of the features of the invention all data in the data base are structured as belonging to one or more logic data bases, such a logic data base being able to, but need not, extend over several processors, Since such a data base, as mentioned above, can (but need not) extend over several processors, backing up of it will be distributed.

According to one of the objects of the invention, transactions shall be allowed to perform operations towards the data base simultaneously with backing up. Within the transaction objects will be updated, created or erased, resulting in many different versions of an object being able to exist during the time of backing up. The backup functionality must therefore get information about the version of an object that shall be included in the backup.

At first hand, this shall now be explained more closely with reference to the flow charts shown in FIGS. 2–8. To start with, from FIG. 2 it appears that the backup function for a certain logic data base is activated by a user 30 by sending an instruction 32 to create backup to a central backup handler 34, the receipt of the instruction by the backup handler being indicated at 36. The central backup handler has information regarding the processors over which the current backup system extends and synchronizes the backup function over the processors, starting by taking the state STATE=SYNCHBACKUP, indicated at 38. The synchronization includes that local data base handlers, one of which has been indicated at 40, are informed that backup will be started, and are instructed to set backup flag. A new transaction log is created, in which all transactions which have not attained commit-state and which shall therefore not be included in the backup are logged. Thereupon backing up is performed only of changes of transactions in the old transaction log.

More in detail the synchronization may imply the following:

1. The central backup handler 34 instructs, indicated at 42. The local data base handlers 40 to set backup flag in the current logic data base. The receipt of the instruction is indicated at 44. This instruction shall be acknowledged. The backup flag informs the local data base handlers that backup will be started and results in the local data base handlers changing behavior as concerns storing of objects located in the logic data base in question.

2. The local data base handlers set backup flag and inform that this has been performed, marked at 46. The receipt of the message at the central backup handler is marked at 48.

3. Time supervision of all local data base handlers acknowledging is carried through with the steps indicated at 50 in FIG. 2 and in FIG. 3. When all the local data base handlers have acknowledged, the central backup handler instructs, indicated at 52, local log handlers 54 to perform the following steps. The performance of the steps is indicated by the steps shown at 56.
   a) Create a new transaction log where all transactions, which have not reached the commit phase and which therefore shall not be included in the backup, will be logged.
   b) Change a "BackupSynch"-variable, included in the transaction log to "Exclude" (see below),
   c) When a counter indicating the number of proceeding transactions in commit state towards the earlier transaction log (the transaction log prevailing at start of the steps in accordance with paragraph 1 above) takes the count 0, the central backup functionality is informed that there is no coordinator for any transaction in the current processor that wants updates to be included in the backup. The sending of this message is indicated at 58, and the receipt thereof at 60.

The "BackupSynch" variable can take the values "Include/Exclude", and its value shall be used by the local data base handler and by the local backup handler to decide whether an object shall be included in the backup or not. The "BackupSynch" variable is collected by the coordinator 30 for the transaction in connection with it entering "COMMIT" in the transaction log, indicated at 62 in FIG. 5a and at 64 in FIG. 5b. The sending and receipt of the "BackupSynch" variable is indicated at 66 in FIG. 5b and at 68 in FIG. 5a. The coordinator then sends the "BackupSynch" value and the Commit message to all participating transactions. These in turn distribute the "BackupSynch" value to the different data base objects. In this way it is secured that all objects in the transaction get the same "BackupSynch" value and will be included in or alternatively excluded from the backup.

During the whole synchronization phase there will be two transaction logs:

one earlier (old) transaction log containing transactions the changes of which of the data base will be reflected in the backup, and a new transaction log containing transactions being in other cases than COMMIT when backing up started and the changes of which of the data base will not be reflected by the backup.

After the local log handlers have been informed of the change of the log, the above described synchronization is ready. Copying objects to the backup area will, however, not start until the local data base handler has made all changes from transactions to be included in the backup visible in the data base. This step therefore also requires a second synchronization, viz. among local data base handlers, local backup handlers and local log handlers. This synchronization is based upon the local log handler keeping up with the number of transactions in commit-state being included in the old transaction log. The number of transactions are counted down when the log handler receives an instruction to enter "ENDTRANSACTION" in the old transaction log. "END-TRANSACTION" is entered when the local data base handler has performed the changes of the data base and has informed the transaction of this. The last mentioned steps are indicated in FIG. 7a and b.

To sum up, the second synchronizing involves that:
1. The local data base handler performs the changes included in the transaction and informs the transaction about this.
2. The transaction enters "END-TRANSACTION" in the transaction log.
3. The local log handlers count down the counter indicating the number of transactions in commit state in the transaction log and inform the central backup handler when the count is equal to zero.

Figure 4:
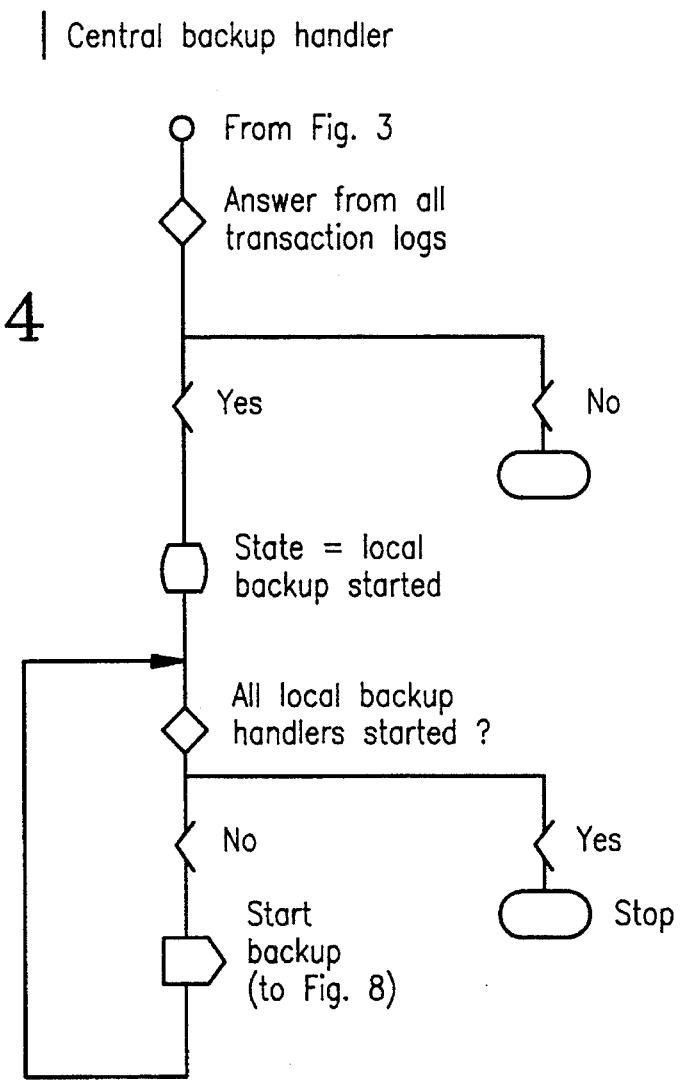

When the number of transactions in the old transaction log is zero in all local log handlers, the central backup handler instructs all local backup handlers to begin copying the objects to be included in the backup to the backup area. The sending of the instruction as well as the steps preceding this are indicated in FIG. 4. The objects in question have, according to FIG. 6, been backup marked in the LID table of the local dam base handler as a response to the later changing behavior when the backup flag was set. The behavior of the local dam base handler in association with backup appears from FIGS. 6, 8, and 9 and will be described more closely below.

Figure 9:
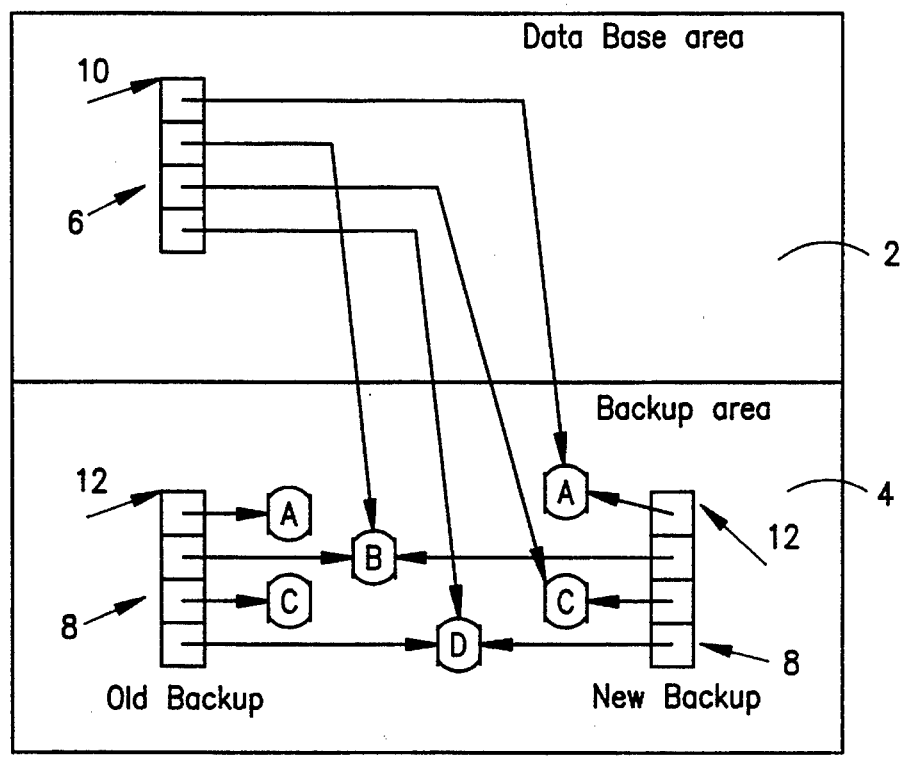
FIG. 9 in a similar view as FIG. 1 illustrates the situation in the data base during an end stage of a backup performed in accordance with the invention.
Figure 2:
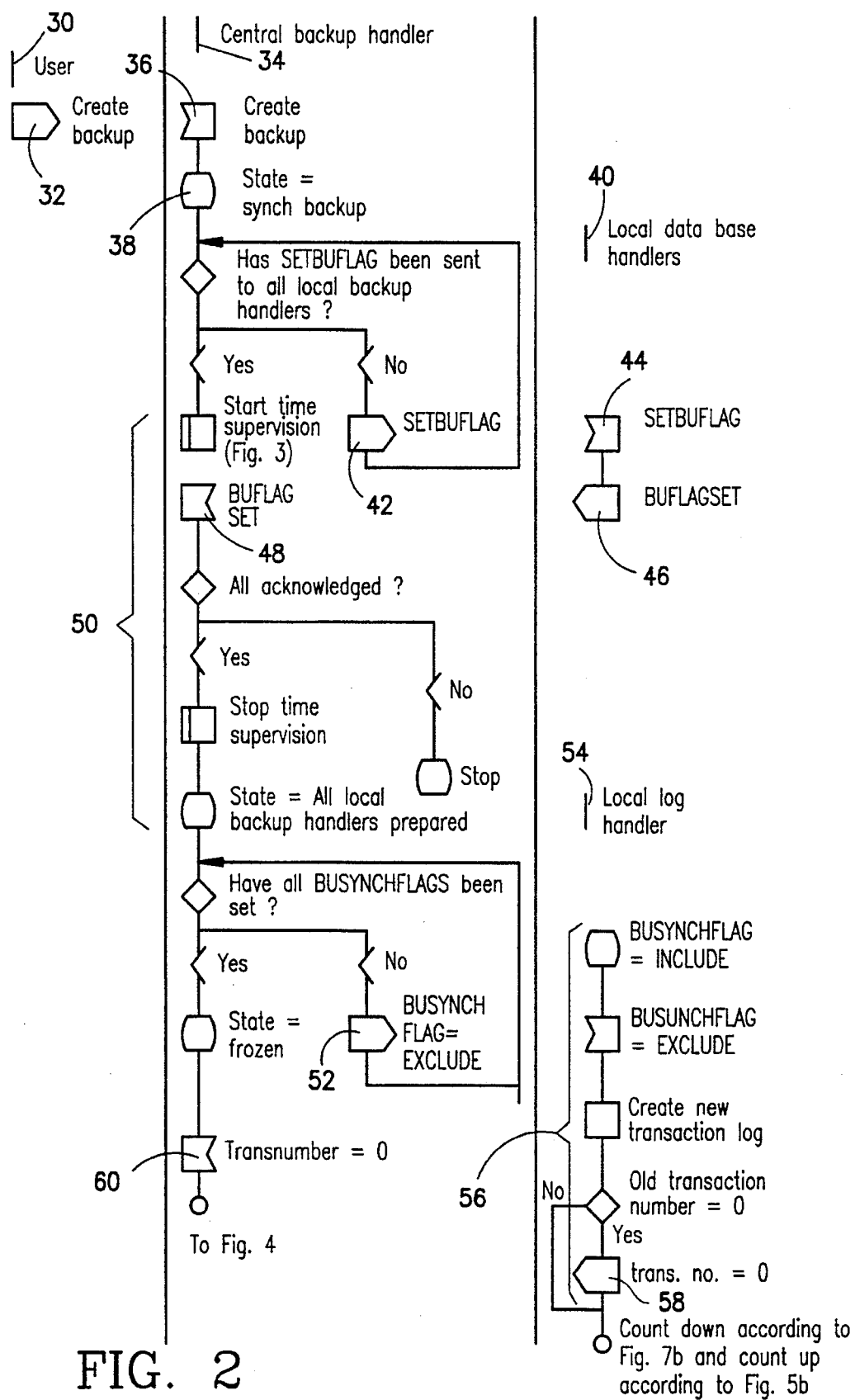
Figure 3:
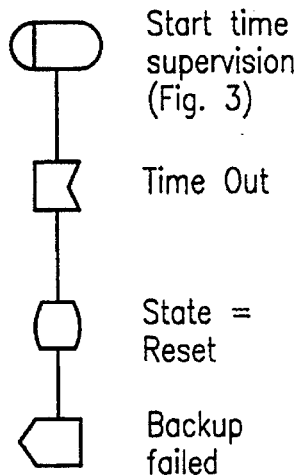

Copying of objects will be performed to the backup area. From security reasons the old backup will be left on the primary memory until the new backup is ended. Then the old backup will be packeted and stored in a secondary memory. During the time taken for creating the new backup and pocketing the old one there will be two backup versions on the primary memory, which does not imply that all objects are doubled but only that the access structure or the objects which are specific for the respective backup. The situation is illustrated in FIG. 9, where the same elements as in FIG. 1 have the same reference numerals. FIG. 9 will, in fact, be changed to agree with FIG. 1 after ending of the backup steps.

Figure 10:
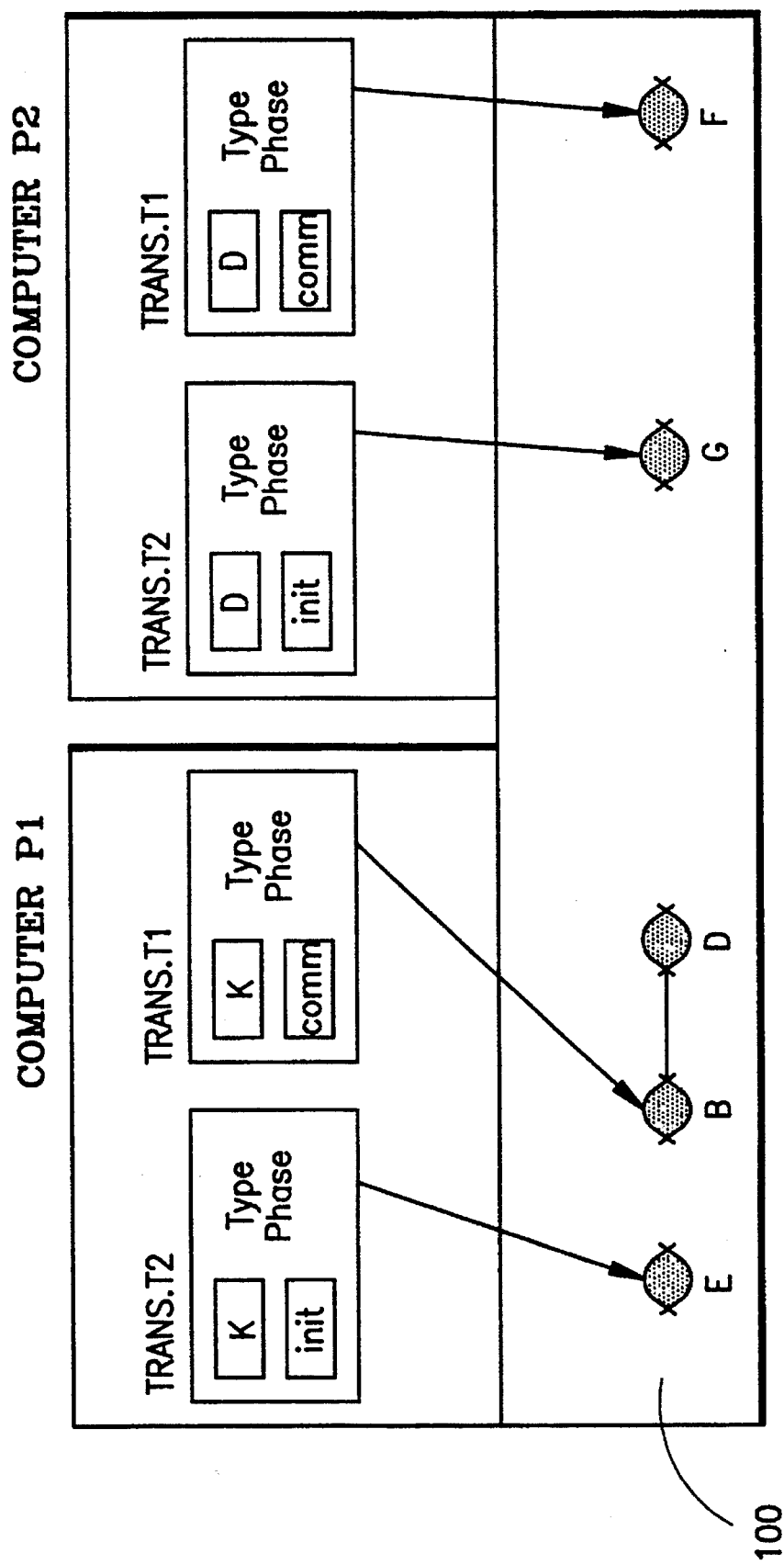
FIG. 10 schematically illustrates a data base extending over two processors, the situation immediately before start of a backup being shown.
Figure 11:
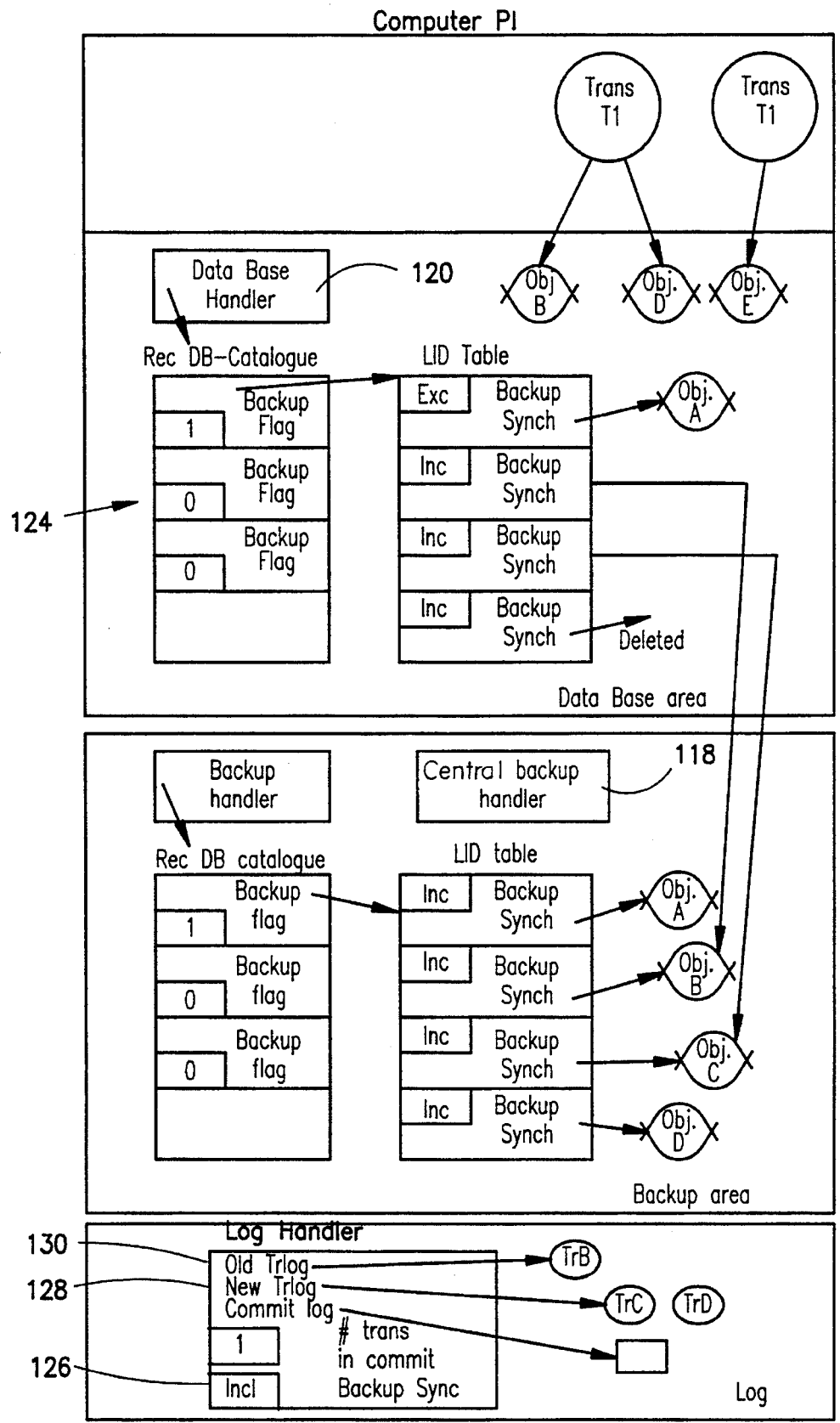
FIG. 11 enlarged and in more detail illustrates the data base and log situation in one of the processors according to FIG. 10 at a later point of time during the backup.

With reference to FIGS. 10 and 11 an embodiment of the backup functionality will now be described. More particularly, the embodiment starts from the presumption that backup shall be taken at a time T=O of a dam base 100 extending over two processors P1 and P2, respectively. The associated backup area and log area are not shown. At T=O there are two transactions T1 and T2 accessing the dam base. In the processor P1 these transactions may form coordinator, indicated at K, and in the processor P2 participant, indicated with D. FIG. 10 shows the situation at T=O, and FIG. 11 shows an enlarged and more deralied view of the dam base 100 in question in the processor P1.

Initiation of backup is performed in the following way. The first thing that happens at T=O is that, in accordance with 42 in FIG. 2, the central backup handler 118 of the processor P1 will instruct the local data base handlers in P1 and P2 to set the backup flag in the respective data base handler, the one of which in P1 is shown at 120. This is illustrated in FIG. 11 by the fact that, in a catalogue 124 of applications, in the figure called "RecDB-cataloque" (RecDB=Recovery Data Base), the backup flag is set to 1. According to 52 and 56 in FIG. 2, the value of the "BackupSynch" variable in the log of P1 and P2 is changed from "include", indicated at 126 for the processor P1, to "exclude". A new transaction log is created, cf. 56 in FIG. 2, this being indicated for the processor P1 in FIG. 11 at 128.

At TO there are two transactions working towards the data base, viz.

the transaction T1 which is in the commit phase and shall update object B and remove object D in the processor P1, and update the object F in the processor P2.

the transaction T2 being in the initial phase shall create object E in processor P1 and update object G in processor P2.

Examples of synchronization of the transactions towards backup will now be described.

Figure 5A:
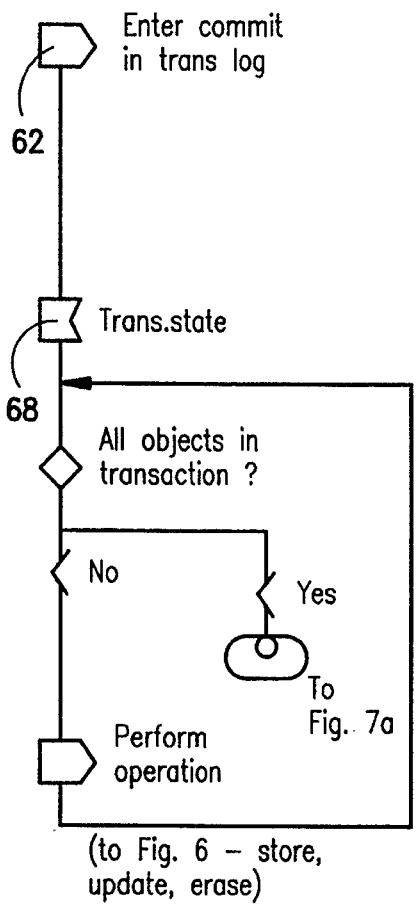
Figure 5B:
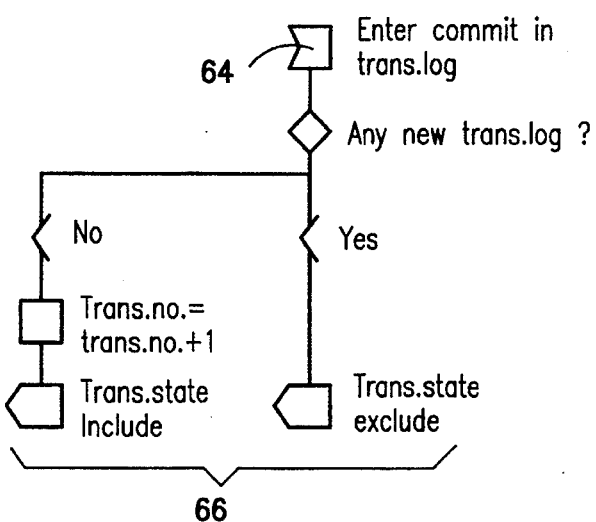
Figure 6:
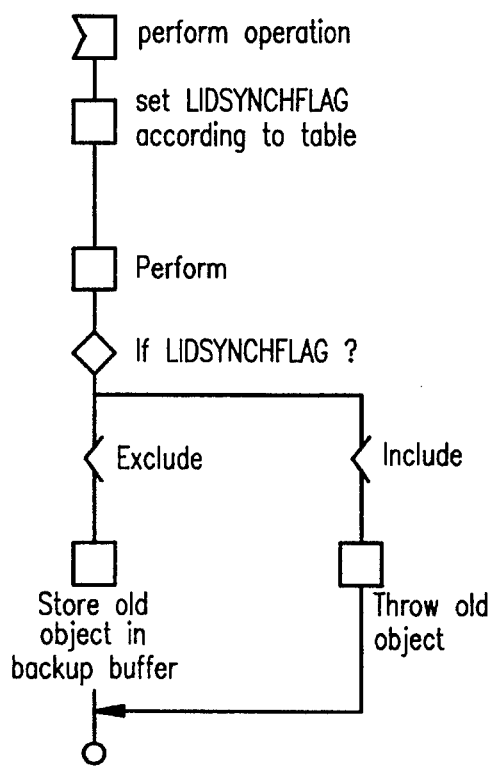

Since the transaction T1 is a coordinating transaction it enters, according to 64 in FIG. 5b, COMMIT in the old transaction log, indicated at 130 in FIG. 11, and collects "BackupSynch=Include", cf. 68 in FIG. 5a. The BackupSynch variable is sent to participator T1 in processor P2 in connection with GLOBAL-COMMIT. Then the transaction T1 will call different methods in the data base handler for making the changes, which have been performed to data by the transaction, visible in the data base. In the present embodiment the transaction T1 will desire to store object B' and remove object B. Generally for all types of calls (when the backup flag is set) the data base handler compares the value in the BackupSynch variable of the object with the value of the same variable in the entry for the object in the LID table. Depending upon the result of the comparison and the method called by the object the data base handler will perform some of the measures described in the tables in FIGS. 12–14. In FIG. 12 updating of objects is illustrated, in FIG. 13 the creation of new objects, and in FIG. 14 the removal of objects.

For object B, which shall be updated the second case in column 2 is valid, since the backup value both in the data base record and in the LID table is included. For object D in FIG. 14 likewise case 2 in column 2 is valid for the same reason as in the preceding case. Also the object E shall be included in the backup.

When the data base handler has made the operations of the transaction T1 visible in the data base it will inform the transaction which in turn informs the log. The log counts down the number of transactions in the old commit log and since it now becomes 0 the central backup function is informed, cf. 58, 60 in FIG. 2, that copying of objects from the data base area to the backup area has started. When the participating local log handlers have informed that they can start backup, the central backup handler instructs all local backup handlers to start dumping to backup, as appears from the steps included in FIG. 4.

For dumping objects to the backup area the following happens, with reference to FIG. 8. The local backup handlers will go through the LID table, indicated at 140, and check the value of the BackupSynch variable, indicated at 142. If it is equal to "include" the object will be copied to the backup area, if it is equal to "exclude" the object will not be copied but the value of the variable is set to "Include" as a preparation for the next backup, cf. steps 144 and 146. When all objects in the LID table have been copied the objects in the backup buffer will be copied to the backup area. Then the backup handler will set the backup flag for the data base to zero so that the date base handler can revert to its usual behavior.

What is claimed is:

1. A backup system for a real time data base on primary memory in operation, said data base being distributed over a number of processors which execute a plurality of functionalities, said backup system comprising:

a plurality of logic data bases, of which each is able to extend over several of said processors, and each has a backup functionality associated with it, wherein all data in said real time data bases is distributed over said logic data bases, a central backup handler, which has information regarding processors, over which the backup system extends, a local database handler for each processor, and activating functionality for activating said backup functionality of a current one of said logic data bases by sending a message to said central backup handler to perform synchronization of the backup functionality over processors over which said current logic data base extends, said synchronization including that the local data base handlers are informed that backup will be started and that a new transaction log should be created, in which all transactions which shall not be included in the backup are logged, and backup will only contain changes of transactions in an earlier transaction log.

2. A system according to claim 1, wherein said activating functionality activates said backup functionality of a logic database periodically or at a command of an operator.

3. A system according to claim 1, wherein said synchronization includes the central backup handler instructing the local data base handlers to set a backup flag in the current logic data base informing the local data base handlers that backup will be started and causing them to change behavior with respect to storing objects located in the current logic data base, and the local data base handlers after the backup flag has been set acknowledging this to the central backup handler.

4. A system according to claim 3, wherein the central backup handler instructs local log handlers of current processors to create a new transaction log when all local data base handlers have acknowledged that the backup flag has been set.

5. A system according to claim 4, wherein the new transaction log includes a backup synchronization variable that is used by the local data base handler and by local backup handlers to decide whether objects shall be included in a backup, and the central backup handler instructs the local log handlers to change a value of said variable in the new transaction log and the object thereof shall not be included in the backup.

6. A system according to claim 5, wherein the backup synchronization variable is collected by a coordinator for a transaction in connection with entering a commit value into the transaction log indicating that the transaction has attained a commit state, and the value of the backup synchronization variable and the commit value is sent to all participating transactions, which in turn distribute the backup synchronization value to different data base objects, and all objects in the transaction get a same backup synchronization value.

7. A system according to claim 1, further comprising a counter for indicating a number of proceeding transactions in a COMMIT state towards an old transaction log, said synchronization including that at zero count of the counter the central backup handler is informed that there is no coordinator for any transaction in the current processor wishing updatings to be included in the backup.

8. A system according to claim 1, wherein copying of objects is initiated after local log handlers have been informed that the local data base handler has made all changes from transactions, which shall be included in the backup, visible in the data base.

9. A system according to claim 8, wherein making changes visible includes synchronization among the local data base handler, backup handler and log handler.

10. A system according to claim 9, wherein said synchronization being performed by the local log handler keeps up with a number of transactions existing in an earlier transaction log, the number of transactions being counted down as the transaction enters a predetermined end message in the earlier transaction log, entering the predetermined end message being carried through when the local data base handler has performed the changes in the data base and informed this to the transaction.

11. A system according to claim 9, wherein the central backup handler instructs all local backup handlers, when a number of transactions in the old transaction log is zero in all local log handlers, to begin copying the objects to be included in a backup to the backup area, said objects having been backup marked by the local data base handler in response to its change of behavior when the backup flag was set.

12. A system according to claim 1, wherein objects are copied to a backup area, and an earlier backup is stored in a primary memory until a new backup is ended, whereupon the earlier backup is stored in a secondary memory.

* * * * *